US008872829B2

(12) United States Patent
Lin et al.

(10) Patent No.: US 8,872,829 B2
(45) Date of Patent: Oct. 28, 2014

(54) SYSTEM AND METHOD FOR PROCESSING FREQUENCY SPECTRUM OF A SIGNAL IN AN IMAGE FILE

(75) Inventors: Sheng-Han Lin, New Taipei (TW); Tsung-Hsun Chiang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 499 days.

(21) Appl. No.: 13/216,262

(22) Filed: Aug. 24, 2011

(65) Prior Publication Data

US 2012/0299948 A1 Nov. 29, 2012

(30) Foreign Application Priority Data

May 25, 2011 (TW) .............................. 100118275 A (51) Int. Cl.
*G06T 11/20* (2006.01)
*G09G 5/02* (2006.01)
*G09G 5/00* (2006.01)
*G06T 7/40* (2006.01)
*G01J 3/02* (2006.01)

(52) U.S. Cl.
CPC .............. *G01J 3/0264* (2013.01); *G06T 7/402* (2013.01); *G06T 2207/10024* (2013.01)
USPC ........... 345/440; 345/441; 345/442; 345/589; 345/594; 345/643

(58) Field of Classification Search
None
See application file for complete search history.

(56) References Cited

U.S. PATENT DOCUMENTS

| | | | |
|---|---|---|---|
| 2002/0131651 A1* | 9/2002 | Anantharamu et al. | ....... 382/284 |
| 2004/0199277 A1* | 10/2004 | Bianchi et al. | ................... 700/94 |
| 2005/0041034 A1* | 2/2005 | Luo et al. | ....................... 345/589 |
| 2006/0015948 A1* | 1/2006 | Macrae et al. | .................... 800/3 |
| 2010/0183281 A1* | 7/2010 | Yahata et al. | ................... 386/70 |
| 2011/0205259 A1* | 8/2011 | Hagood, IV | ................... 345/690 |
| 2012/0283954 A1* | 11/2012 | Bray et al. | ....................... 702/19 |

* cited by examiner

*Primary Examiner* — Maurice L McDowell, Jr.
*Assistant Examiner* — Donna J Ricks
(74) *Attorney, Agent, or Firm* — Novak Druce Connolly Bove + Quigg LLP (57) ABSTRACT

A system and method processes frequency spectrum of a signal in an image file of a computing device. The system loads the frequency spectrum from a storage system of the computing device, and displays the frequency spectrum on a user interface of the computing device. The method sets parameters of an object spectrum curve to be processed in the frequency spectrum and enables accessional functions for processing the object spectrum curve. According to the input parameters and the enabled accessional functions, an output range of the object spectrum curve may be displayed, and spectrum data of the object spectrum curve within the output range from the frequency spectrum may be output into a predetermined form, and stores the predetermined form according to a predetermined storage path.

18 Claims, 4 Drawing Sheets

SYSTEM AND METHOD FOR PROCESSING FREQUENCY SPECTRUM OF A SIGNAL IN AN IMAGE FILE

BACKGROUND

1. Technical Field

Embodiments of the present disclosure relate to frequency spectrum systems and methods, and more particularly to a system and method for processing frequency spectrum in an image file in a computing device.

2. Description of Related Art

Frequency spectrum of a signal is very common in physics. The signal may be a wave, such as an electromagnetic wave, random vibration, or an acoustic wave. For example, frequency spectrum of a vibration signal of a device may show vibration characteristics of the device according to frequencies, and amplitudes plotted against the frequencies. However, if users only have an image file of the frequency spectrum, and do not have the actual spectrum data of the frequency spectrum, it may be difficult to analyze the characteristics of the signal, and the analysis may be inaccurate. Furthermore, the overall characteristics and any problem in or of the device may be not evaluated properly.

DETAILED DESCRIPTION

The disclosure is illustrated by way of example and not by way of limitation in the graphs of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
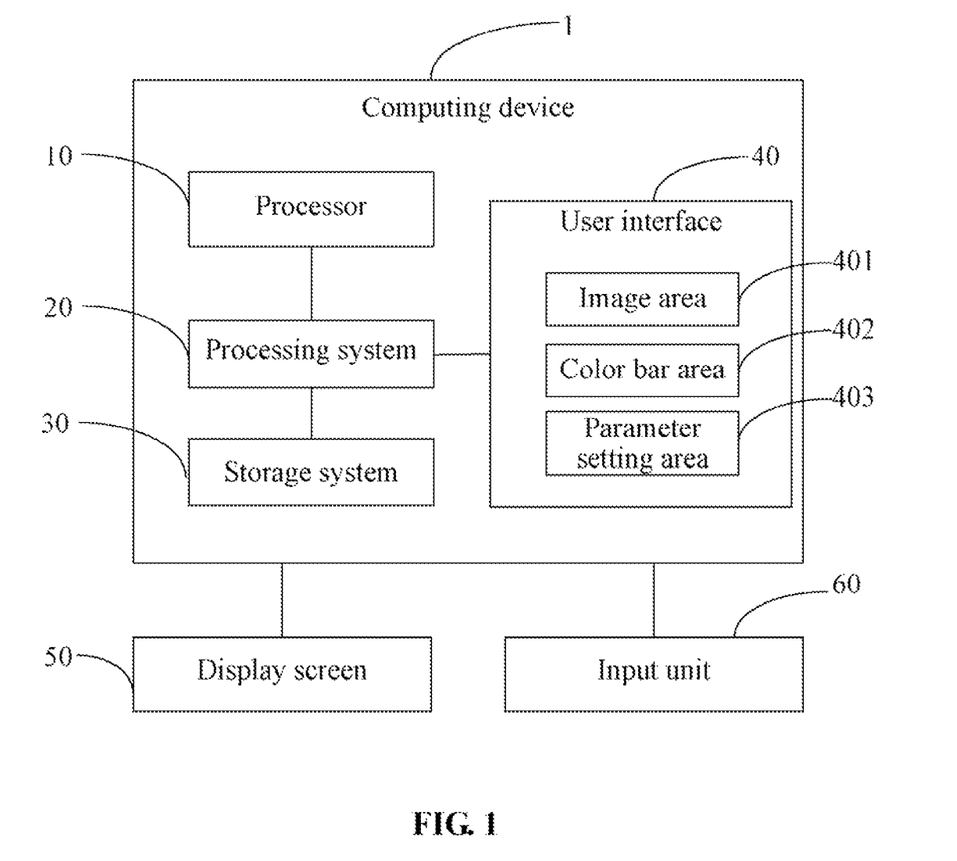
FIG. 1 is a schematic diagram of one embodiment of a computing device including a processing system.

FIG. 1 is a schematic diagram of one embodiment of a computing device 1. The computing device 1 includes a processing system 20, a storage system 30, a user interface 40, and at least one processor 10. The processor 10 executes one or more computerized codes and other applications of the computing device 1, to provide functionality for the computing device 1. The processing system 20 may process frequency spectrum of a signal in an image file stored in the storage system 30 to acquire spectrum data in the frequency spectrum, and display the spectrum data in the frequency spectrum on the user interface 40. The signal may be a wave, such as an electromagnetic wave, random vibration, or an acoustic wave.

Figure 2:
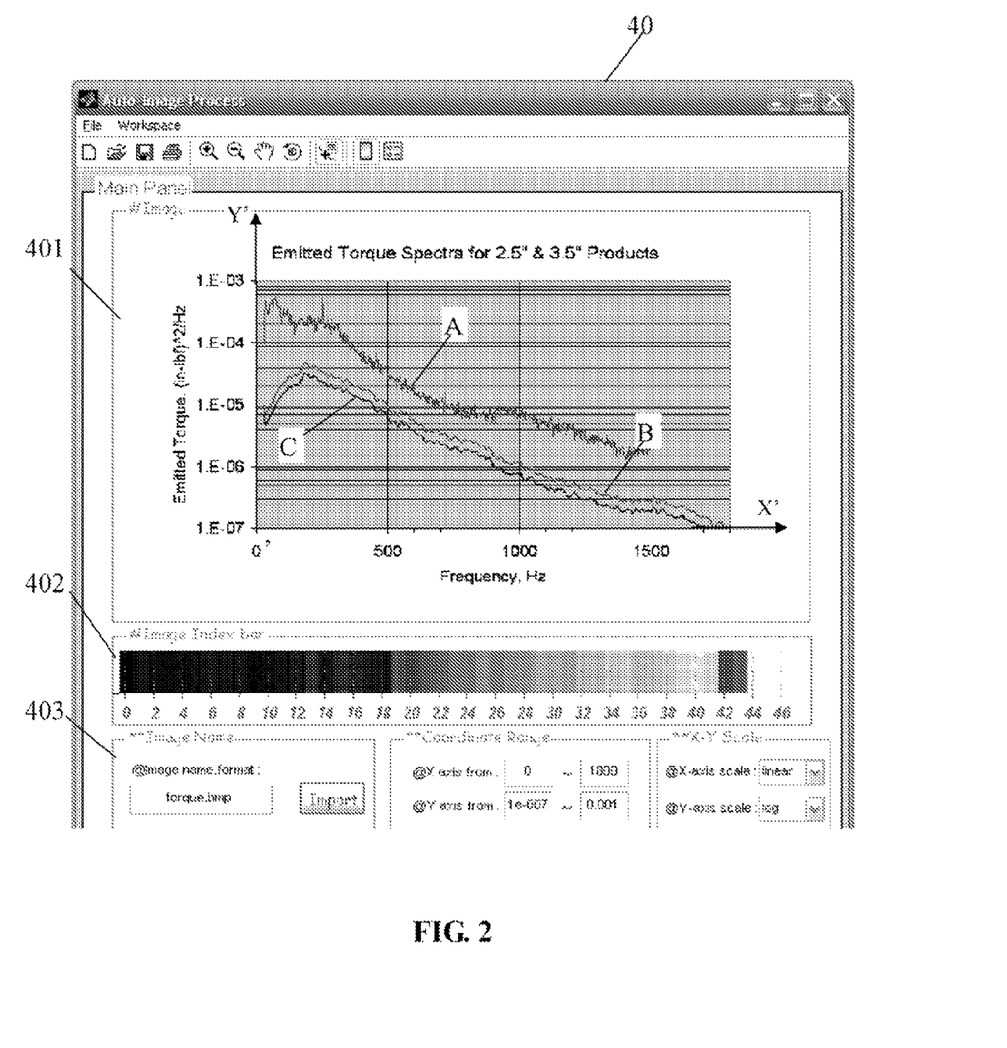
FIG. 2 is a schematic diagram of one embodiment of a user interface of FIG. 1.

The computing device 1 connects to a display screen 50 and an input unit 60. The display screen 50 may display visible data of the computing device 1, such as display of the user interface 40. FIG. 2 is a schematic diagram of one embodiment of the user interface 40. In one embodiment, the user interface 40 provides an image area 401, a color bar area 402, and a parameter setting area 403 to display and set, or reset different parameters. The image area 401 may display the image file of the frequency spectrum. The color bar area 402 may display index values of all colors of the frequency spectrum in the image area 401. The parameter setting area 403 may display parameters required to be set or reset by the users. The input unit 60 may be used to navigate the frequency spectrum in the image area 401. The input unit 60 may be a mouse or keyboard, for example. It is understood that arrangements of the image area 401, the color bar area 402, and the parameter setting area 403 on the user interface 40 may vary depending on the embodiment, and the user interface 40 may also include additional areas for input/output of data.

In one embodiment, the image area 401 has a predetermined user coordinate system XOY. The predetermined user coordinate system may be defined by setting a point in the lower left corner of the image area 401 as an origin "O", a right direction of horizontal line of the image area 401 as a positive direction of an X axis, and an up direction of a vertical line of the image area 401 as a positive direction of a Y axis.

The storage system 30 may store various data of the computing device 1. In one embodiment, the storage system 30 stores image files of various frequency spectrums of various signals. The formats of the image files in the storage system 30 may be bitmap (bmp) formats, Portable Network Graphic (PNG) formats, for example. The frequency spectrum of a signal in the image file may be in a coordinate system X'O'Y'. The frequency spectrum may include frequencies (on the X' axis) and an amplitude corresponding each of the frequencies (on the Y' axis). The image file of the frequency spectrum includes an RGB value of each pixel in the frequency spectrum, and an index value corresponding to the RGB value. As shown in FIG. 2, the image file of the frequency spectrum in the image area 401 further includes the name of the frequency spectrum, the label of the X' axis, and the label of the Y' axis, and other information. In one embodiment, the frequency spectrum may include various spectrum curves having different colors. For example, the frequency spectrum in FIG. 2 includes a first spectrum curve marked with "A" in red, a second spectrum curve marked with "B" in pink, and a third spectrum curve marked with "C" in blue.

Figure 3:
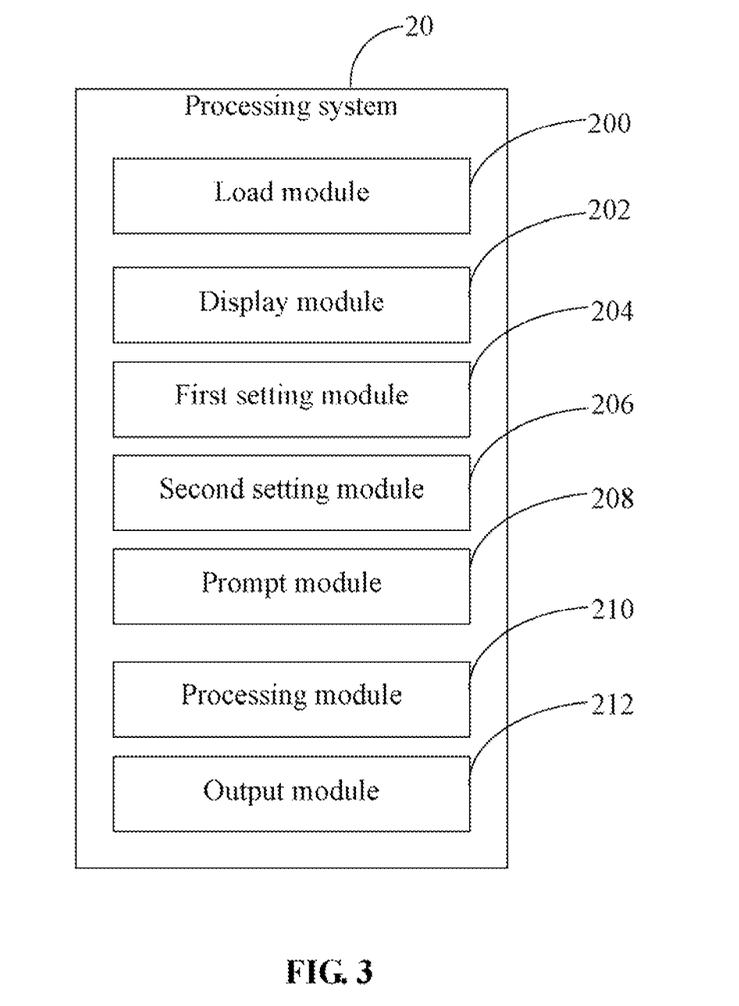
FIG. 3 is a block diagram of one embodiment of the processing system included in the computing device of FIG. 1.

FIG. 3 is a block diagram of one embodiment of the processing system 20 included in the computing device 1 of FIG. 1. In some embodiments, the processing system 20 may include a load module 200, a display module 202, a first setting module 204, a second setting module 206, a prompt module 208, a processing module 210 and an output module 212. The modules 200, 202, 204, 206, 208, 210 and 212 comprise computerized codes in the form of one or more programs that are stored in the storage system 30. The computerized code includes instructions that are executed by at least one processor 10 to provide functions for the modules. Details of these operations are as follows.

The load module 200 loads the image file of the frequency spectrum from the storage system 30, and displays the image file of the frequency spectrum on the image area 401.

The display module 202 reads all colors of the frequency spectrum from the image file, and displays all the colors and index values corresponding to all the colors on the color bar area 402. The display module 202 reads an index value corresponding to the RGB value of each pixel in the frequency spectrum, to acquire the index values of all the colors. In one embodiment, if a cursor of the input unit 60 rests on one pixel in the image area 401, the display module 202 displays coordinates (the X and Y coordinates), an index value and an RGB value of the pixel. The user may move the cursor through the input unit 60 into the image area 401 to reveal the coordinates, the index value, and the RGB value corresponding to each of the pixels in the image file of the frequency spectrum.

The first setting module 204 sets and inputs parameters of an object spectrum curve in the frequency spectrum, through the parameter setting area 403. The object spectrum curve requires to be processed, to acquire the spectrum data of the object spectrum curve. In one embodiment, the input parameters include an index value of the object spectrum curve, the minimums and maximums of the X' and the Y' coordinates in the frequency spectrum, a predetermined storage path of the object spectrum curve, a background index value for outputting a graph of the object spectrum curve.

In one embodiment, the index value of the object spectrum curve can be set according to the index values displayed on the color bar area 402. For example, if the first spectrum curve marked with "A" in red is the object spectrum curve to be processed, and the index value of the red color is 42, the index value of the object spectrum curve can be set to be 42. The minimum and maximum values for the X' and the Y' coordinates can be acquired through the frequency spectrum displayed in the image area 401. As shown in FIG. 2, the minimum X' coordinate is 0, and the maximum X' coordinate is 1800. The background index value of the output graph is set to be equal to a background index value of the frequency spectrum.

The second setting module 206 enables accessional functions for processing the object spectrum curve according to user's input, through the parameter setting area 403. In one embodiment, the accessional functions include a function of outputting the graph of the object spectrum curve, a function of cleaning a particular range of the image area 401, a function of calculating a root mean square acceleration (GRMS) value, and a function of message prompt for the parameters. The GRMS value is calculated by a predetermined GRMS formula. The object spectrum curve integrates the frequencies of the object spectrum curve to acquire an area value covered by the object spectrum curve, and extracts the area value to acquire the GRMS value.

If the function of outputting the graph is enabled, the first setting module 204 further sets a title of the object spectrum curve, and labels of the X' axis and the Y' axis of the output graph, and scales of the X' axis and the Y' axis of the output graph. The scales include a logarithm scale, and a linearity scale. For example, in the linearity scale, the scales from 0 to 500 represent one centimeter (1 cm), and the scales from 0 to 1000 represent 2 cm. In the logarithm scale, the scales from 0 to 10 represent 1 cm, and the scales from 0 to 100 represent 2 cm. If the function of cleaning the particular range of the image area 401, that is, the object spectrum curve in the cleaned particular range of the image area 401 will not be displayed, the first setting module 204 sets an X range and a Y range in the image area 401 to be cleaned. If the function of calculating the GRMS value is enabled, an X' range of the frequency spectrum is set to confirm a calculation range of the RGMS value.

If the first setting module 204 sets the parameters, the prompt module 208 displays a predetermined description for each of the input parameters. The description may a function description or a specification description for each of the input parameters. The prompt module 208 further displays a predetermined description corresponding to each of the additional functions, when the first setting module 204 enables the additional functions. In one embodiment, the prompt module 208 may display a message box near each of the input parameters or each of the additional functions to prompt for an input of a user. If the function of message prompt for the parameters is enabled, the prompt module 208 further confirms whether the input parameters meet predetermined specifications. In one embodiment, the prompt module 208 may receive input, from the user, to confirm whether or not the image file of the frequency spectrum is correct according to the format of the image file. The prompt module 208 confirms whether or not the index value of the object spectrum curve is correct according to the index values in the color bar area 402. The prompt module 208 further may receive input, from the user, to confirm whether or not the calculation range of the GRMS value is correct according to the minimum and maximum X' coordinates of the frequency spectrum.

If the prompt module 208 confirms that the input parameters do not meet predetermined specifications, the first setting module 204 further resets the input parameters.

The processing module 210 displays an output range of the object spectrum curve, and reads the spectrum data of the object spectrum curve within the output range from the frequency spectrum. In one embodiment, the output range is a range of the X' coordinates of the object spectrum curve. The spectrum data includes the X' coordinates and the Y' coordinates corresponding to all the pixels of the object spectrum curve within the output range. The processing module 210 confirms the output range by the intersection between the calculation range of the GRMS value and the original range of the object spectrum curve. The original range of the object spectrum curve can be confirmed by the minimum and maximum X' coordinates corresponding to the index values of the object spectrum curve. For example, if the range of the X' coordinates of the GRMS value is [0,1000], and the original range of the object spectrum curve is [24.6575,1500], the processing module 210 confirms the output range is [24.6575, 1000].

In one embodiment, the processing module 210 reads the X' and Y' coordinates of one pixel in the frequency spectrum by the following method. The processing module 210 reads the X and Y' coordinates of the pixel in the image area 401, and confirms an $X_0$ coordinate and a $Y_0$ coordinate of a point in the lower left corner of the frequency spectrum, according to the minimum ($X'_0$) and the maximum ($X'n$) of the X' axis, the minimum ($Y_0$) and the maximum ($Y'n$) of the Y' axis, and the background index value. The processing module 210 further confirms an Xn coordinate of a point of which the index value is equal to the background index value in the lower right corner, and a Ym coordinate of a point of which the index value is equal to the background index value in the upper left corner. The X' coordinate is confirmed by the formula $$"X' = X'_0 + (x - x_0) \times \frac{x'_n - x'_0}{x_n - x_0}",$$

and the Y' coordinate is confirmed by the formula $$"Y' = Y'_0 + (y - y_0) \times \frac{y'_m - y'_0}{y_m - y_0}".$$

The calculation $$"\frac{x'_n - x'_0}{x_n - x_0}"$$

is the proportion between the X' coordinates in the frequency spectrum and the X coordinates in the image area 401, and the calculation $$"\frac{y'_m - y'_0}{y_m - y_0}"$$

is the proportion between the Y' coordinates in the frequency spectrum and the Y coordinates in the image area 401.

In some embodiments, if the function of calculating the GRMS value is enabled, the processing module 210 further displays the GRMS value calculated through the predetermined GRMS formula, according to the input parameters and the calculation range. If the function of outputting the graph is enabled, the processing module 210 reads the X' coordinates and the Y' coordinates of the pixels of which the index values are equal to the background index value and also equal to the index value of the object spectrum curve, to display the graph of the object spectrum curve on the display screen 50, according to the input parameters and the scales of the X' axis and Y' axis. The processing module 210 may further add the set label for the X' axis on the left side of the output graph, the set label for the Y' axis below the output graph, and a set title on the upper side of the output graph. If the function of outputting the graph is enabled and the function of cleaning the particular range of the image area 401 is also enabled, the processing module 210 further replaces the display of the index values corresponding to the pixels in the cleaned particular range with the display of the background index value.

The output module 212 outputs the spectrum data of the object spectrum curve in a predetermined form (i.e., excel form), and stores the predetermined form according to the predetermined storage path.

Figure 4:
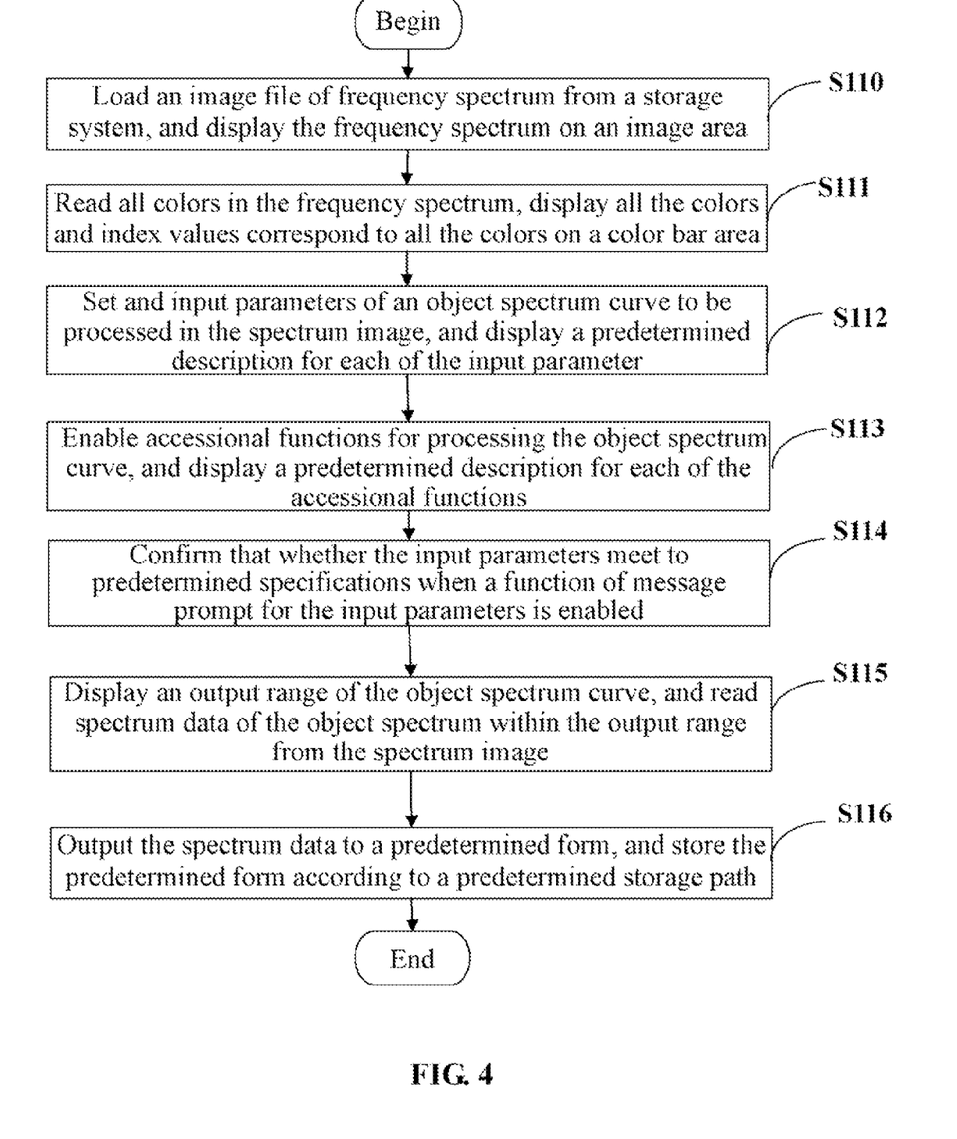
FIG. 4 is a flowchart of one embodiment of a method for processing frequency spectrum of a signal in an image file in a computing device, such as, that of FIG. 1.

FIG. 3 is a flowchart of one embodiment of a method for processing the frequency spectrum in the image file of the computing device 1, such as, that of FIG. 1. Depending on the embodiment, additional blocks may be added, others deleted, and the ordering of the blocks may be changed.

In block S110, the load module 200 loads a image file of the frequency spectrum from the storage system 30, and display the image file of the frequency spectrum on the image area 401. The frequency spectrum may be in a coordinate system X' O' Y'. The frequency spectrum may include frequencies on the X' axis and the amplitude of each of the frequencies on the Y' axis. The image file of the frequency spectrum includes the RGB value of each pixel in the frequency spectrum, and an index value corresponding to the RGB value.

In block S111, the display module 202 reads all the colors in the frequency spectrum from the image file, and displays all the colors and the index values corresponding to all the colors on the color bar area 402.

In block S112, the first setting module 204 sets and inputs parameters of an object spectrum curve to be processed in the frequency spectrum, through the parameter setting area 403, and the prompt module 208 displays a predetermined description for each of the input parameters. In one embodiment, the input parameters include an index value of the object spectrum curve, the minimums and maximums of the X' and the Y' coordinates in the frequency spectrum, a storage path of the object spectrum curve, a background index value of outputting a graph of the object spectrum curve.

In block S113, the second setting module 206 enables accessional functions for processing the object spectrum curve, through the parameter setting area 403, and the prompt module 208 displays a predetermined description for each of the additional functions. In one embodiment, the accessional functions include a function of outputting the graph of the object spectrum curve, a function of cleaning a range of the image area 401, a function of calculating a GRMS value, and a function of message prompt for the input parameters.

In block S114, when the function of message prompt for the input parameters is enabled, the prompt module 208 confirms whether the input parameters meet predetermined specifications, and if the input parameters do not meet predetermined specifications, the first setting module 204 further resets the input parameters.

In block S115, the processing module 210 displays an output range of the object spectrum curve, and reads the spectrum data of the object spectrum curve within the output range from the frequency spectrum, according to the input parameters and the enabled additional functions. In one embodiment, the output range is a range of the X' coordinates of the object spectrum curve. The spectrum data includes the X' coordinates and the Y' coordinates corresponding to all the pixels of the object spectrum curve. The processing module 210 confirms the output range by the intersection of the calculation range of the GRMS value and the original range of the object spectrum curve.

In block S116, the output module 212 outputs the spectrum data of the object spectrum curve in a predetermined form, and stores the predetermined form in according to the predetermined storage path.

It should be emphasized that the described exemplary embodiments are merely possible examples of implementations, and have been set forth for a clear understanding of the principles of the present disclosure. Many variations and modifications may be made to the-described exemplary embodiments without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for processing frequency spectrum of a signal in an image file using a computing device, the method comprising:
   loading the image file of the frequency spectrum of the signal from a storage system of the computing device, and displaying the frequency spectrum on an image area of a user interface in the computing device;
   reading all colors of the frequency spectrum from the image file, and displaying all the colors and index values corresponding to all the colors on a color bar area of the user interface;
   inputting parameters of an object spectrum curve to be processed in the frequency spectrum through a parameter setting area of the user interface;

enabling accessional functions of processing the object spectrum curve through the parameter setting area;

displaying an output range of the object spectrum curve on a display screen of the computing device, and reading spectrum data of the object spectrum curve within the output range from the frequency spectrum according to the input parameters and the enabled accessional functions; and outputting the spectrum data of the object spectrum curve to a predetermined form, and storing the predetermined form according to a predetermined storage path.

2. The method as claimed in claim 1, wherein the input parameters comprise an index value of the object spectrum curve, minimums and maximums of X' and Y' coordinates in the frequency spectrum, the predetermined storage path of the object spectrum curve, a background index value of outputting a graph of the object spectrum curve; and the accessional functions comprise a function of outputting the graph of the object spectrum curve, a function of cleaning a particular range of the image area, a function of calculating an acceleration root mean square (GRMS) value, and a function of message prompt for the input parameters.

3. The method as claimed in claim 2, further comprising:
displaying the GRMS value calculated through a predetermined GRMS formula according the input parameters and the calculation range, upon the condition that the function of calculating the GRMS value is enabled;

reading X' coordinates and Y' coordinates of the pixels of which the index value is equal to the background index value and equal to the index value of the object spectrum curve, to display the graph of the object spectrum curve on a display screen of the computing device, according to the input parameters, upon the condition that the function of outputting the graph is enabled.

4. The method as claimed in claim 3, further comprising:
replacing the display of the index values corresponding to the pixels in the cleaned particular range with the display of the background index value, upon the condition that the function of outputting the graph and the function of cleaning the particular range of the image area are both enabled.

5. The method as claimed in claim 3, wherein the spectrum data include the X' coordinates and the Y' coordinates correspond to all the pixels of the object spectrum curve with the output range, and an X' coordinate and a Y' coordinate of one pixel from the frequency spectrum is read by:

reading an X coordinate and a Y coordinate of the pixel in the image area;

confirming an $X_0$ coordinate and a $Y_0$ coordinate of a point in the lower left corner of the frequency spectrum, according to the minimum ($X'_0$) and the maximum ($X'n$) of the X' axis, the minimum ($Y'_0$) and the maximum ($Y'n$) of the Y' axis, and the background index value;

confirming an Xn coordinate of a point of which index value is equal to the background index value in the lower right corner, and a Ym coordinate of a point of which index value is equal to the background index value in the upper left corner;

confirming the X' coordinate by a formula of $$\text{``}X' = X'_0 + (x - x_0) \times \frac{x'_n - x'_0}{x_n - x_0}\text{'',}$$

and confirming the Y' coordinate by a formula of $$\text{``}Y' = Y'_0 + (y - y_0) \times \frac{y'_m - y'_0}{y_m - y_0}\text{''.}$$

6. The method as claimed in claim 2, further comprising:
displaying a predetermined description corresponding to each of parameters when setting or inputting the parameters;

displaying a predetermined description corresponding to each of the additional functions, when enabling the additional functions;

confirming whether the input parameters meet predetermined specifications, and resetting the parameters if the input parameters do not meet predetermined specifications.

7. A non-transitory storage medium storing a set of instructions, the set of instructions being executed by a processor of a computing device, cause the computing device to perform a method for processing frequency spectrum of a signal in an image file, the method comprising:

loading the image file of the frequency spectrum of the signal from a storage system of the computing device, and displaying the frequency spectrum on an image area of a user interface in the computing device;

reading all colors of the frequency spectrum from the image file, and displaying all the colors and index values corresponding to all the colors on a color bar area of the user interface;

setting and inputting parameters of an object spectrum curve to be processed in the frequency spectrum through a parameter setting area of the user interface;

enabling accessional functions of processing the object spectrum curve through the parameter setting area;

displaying an output range of the object spectrum curve on a display screen of the computing device, and reading spectrum data of the object spectrum curve within the output range from the frequency spectrum, according to the input parameters and the enabled accessional functions;

outputting the spectrum data of the object spectrum curve to a predetermined form, and storing the predetermined form according to a predetermined storage path.

8. The storage medium as claimed in claim 7, wherein the input parameters comprise an index value of the object spectrum curve, minimums and maximums of X' and Y' coordinates in the frequency spectrum, the predetermined storage path of the object spectrum curve, a background index value of outputting a graph of the object spectrum curve; and the accessional functions comprise a function of outputting the graph of the object spectrum curve, a function of cleaning a particular range of the image area, a function of calculating an acceleration root mean square (GRMS) value, and a function of message prompt for the input parameters.

9. The storage medium as claimed in claim 8, further comprising:
displaying the GRMS value calculated through a predetermined GRMS formula according the input parameters and the calculation range, upon the condition that the function of calculating the GRMS value is enabled;

reading X' coordinates and Y' coordinates of the pixels of which the index value is equal to the background index value and equal to the index value of the object spectrum curve, to display the graph of the object spectrum curve on a display screen of the computing device, according to the input parameters, upon the condition that the function of outputting the graph is enabled.

10. The storage medium as claimed in claim 9, further comprising:
replacing the display of the index values corresponding to the pixels in the cleaned particular range with the display of the background index value, upon the condition that the function of outputting the graph and the function of cleaning the particular range of the image area are both enabled.

11. The storage medium as claimed in claim 9, wherein the spectrum data include the X' coordinates and the Y' coordinates corresponding to all the pixel of the object spectrum curve with the output range, an X' coordinates and a Y' coordinates of one pixel from the frequency spectrum is read by:
reading an X coordinate and a Y coordinate of the pixel in the image area;
confirming an $X_0$ coordinate and a $Y_0$ coordinate of a point in the lower left corner of the frequency spectrum, according to the minimum ($X'_0$) and the maximum ($X'n$) of the X' axis, the minimum ($Y'_0$) and the maximum ($Y'n$) of the Y' axis, and the background index value;
confirming an Xn coordinate of a point of which index value is equal to the background index value in the lower right corner, and a Ym coordinate of a point of which index value is equal to the background index value in the upper left corner;
confirming the X' coordinate by a formula of $$"X' = X'_0 + (x - x_0) \times \frac{x'_n - x'_0}{x_n - x_0}",$$

and confirming the Y' coordinate by a formula of $$"Y' = Y'_0 + (y - y_0) \times \frac{y'_m - y'_0}{y_m - y_0}".$$

12. The storage medium as claimed in claim 8, further comprising:
displaying a predetermined description corresponding to each of parameters when setting or inputting the parameters;
displaying a predetermined description corresponding to each of the additional functions, when enabling the additional functions;
confirming whether the input parameters meet predetermined specifications, and resetting the parameters if the input parameters do not meet predetermined specifications.

13. A computing device, comprising:
a display screen;
a storage system;
at least one processor;
one or more programs that are stored in the storage system and are executed by the at least one processor, the one or more programs comprising:
a load module that loads an image file of frequency spectrum of a signal from the storage system, and displays the frequency spectrum on an image area of a user interface in the computing device;
a display module that reads all colors in the frequency spectrum from the image file, and displays all the colors and index values corresponding to all the colors on a color bar area of the user interface;
a first setting module that inputs parameters of an object spectrum curve to be processed in the frequency spectrum through a parameter setting area of the user interface;
a second setting module that enables accessional functions of processing the object spectrum curve through the parameter setting area;
a processing module that displays an output range of the object spectrum curve on the display screen, and reads spectrum data of the object spectrum curve within the output range from the frequency spectrum according to the input parameters and the enabled accessional functions; and
an output module that outputs the spectrum data of the object spectrum curve to a predetermined form, and stores the predetermined form according to a predetermined storage path.

14. The computing device as claimed in claim 13, wherein the input parameters comprise an index value of the object spectrum curve, minimums and maximums of X' and Y' coordinates in the frequency spectrum, the predetermined storage path of the object spectrum curve, a background index value of outputting a graph of the object spectrum curve; and
the accessional functions comprise a function of outputting the graph of the object spectrum curve, a function of cleaning a particular range of the image area, a function of calculating an acceleration root mean square (GRMS) value, and a function of message prompt for the input parameters.

15. The computing device as claimed in claim 14, wherein the processing module further displays the GRMS value calculated through a predetermined GRMS formula according the input parameters and the calculation range, upon the condition that the function of calculating the GRMS value is enabled; and
the processing module further reads X' coordinates and Y' coordinates of the pixels of which the index value is equal to the background index value and equal to the index value of the object spectrum curve, to display the graph of the object spectrum curve on a display screen of the computing device, according to the input parameters, upon the condition that the function of outputting the graph is enabled.

16. The computing device as claimed in claim 15, wherein the processing module further replaces the display of the index values corresponding to the pixels in the cleaned particular range with the display of the background index value, upon the condition that the function of outputting the graph and the function of cleaning the particular range of the image area are both enabled.

17. The computing device as claimed in claim 15, wherein the spectrum data include the X' coordinates and the Y' coordinates correspond to all the pixels of the object spectrum curve with the output range, the processing module reads an X' coordinate and a Y' coordinates of one pixel from the frequency spectrum by:
reading an X coordinate and a Y coordinate of the pixel in the image area;
confirming an $X_0$ coordinate and a $Y_0$ coordinate of a point in the lower left corner of the frequency spectrum, according to the minimum ($X'_0$) and the maximum ($X'n$) of the X' axis, the minimum ($Y'_0$) and the maximum ($Y'n$) of the Y' axis, and the background index value;
confirming an Xn coordinate of a point of which index value is equal to the background index value in the lower right corner, and a Ym coordinate of a point of which index value is equal to the background index value in the upper left corner;

confirming the X' coordinate by a formula of $$"X' = X'_0 + (x - x_0) \times \frac{x'_n - x'_0}{x_n - x_0},"$$

and confirming the Y' coordinate by a formula of $$"Y' = Y'_0 + (y - y_0) \times \frac{y'_m - y'_0}{y_m - y_0}."$$

18. The computing device as claimed in claim 14, wherein the one or more programs further comprises:
- a prompt module that displays a predetermined description corresponding to each of parameters when setting or inputting the parameters;
- displays a predetermined description corresponding to each of the additional functions, when enabling the additional functions; and
- confirms whether the input parameters meet predetermined specifications, and reset the parameters if the input parameters do not meet predetermined specifications.

\* \* \* \* \*